Sept. 13, 1938.    J. H. VICTOR ET AL    2,130,110

LAMINATED METAL AND ASBESTOS GASKET

Filed Aug. 19, 1936

JOHN H. VICTOR
JOSEPH B. VICTOR

PER *Albert J. Fihe*

ATTORNEY

Patented Sept. 13, 1938

2,130,110

UNITED STATES PATENT OFFICE 2,130,110

LAMINATED METAL AND ASBESTOS GASKET

John H. Victor, Wilmette, and Joseph B. Victor, Oak Park, Ill., assignors to Victor Manufacturing & Gasket Company, Chicago, Ill., a corporation of Illinois Application August 19, 1936, Serial No. 96,773

2 Claims. (Cl. 288—1)

This invention relates to an improved laminated metal and asbestos gasket, and the present application describes an improvement over the prior patents of one of these joint inventors, namely, John H. Victor, the patents being numbered 1,823,341 and 1,823,342, both dated September 15, 1931.

The invention also contemplates an improvement over a prior patent on "Gaskets" No. 1,472,133, granted to Frank J. Oven on October 30, 1923.

One of the important objects of this invention is the provision of a gasket which will be particularly applicable for use between the head and the block of an internal combustion engine, particularly the high compression engines now in vogue, and which will successfully resist the stresses and strains of continuous operation under all conditions of heavy loads, high speed and extreme heat.

A further object is to provide a laminated gasket which shall always be maintained in its original condition of uniform thickness, but which, however, shall be capable of conforming to any irregularities or unevenness in the faces of the head and block so that the joint therebetween will be effectively sealed.

A still further object of the invention is to provide a combination of laminations of metal and softer packing materials such as asbestos, arranged in a manner so that a practically continuous or solid metallic barrier is provided at those points of the gasket which are subject to the most deterioration by heat, namely, the edges of the same which surround the combustion chamber openings.

Another important object is to provide a laminated gasket wherein the flanges which connect the laminations and which surround the combustion chamber and other openings shall be countersunk so as to provide a flush surface over the entirety of the gasket, while, at the same time, providing the necessary and required cushioning features.

Another and still further important object of the invention is to provide additional and special reinforcements around the combustion chamber openings and also between the same, particularly at points where two cylinders of the motor are so closely associated that the ordinary gasket would be destroyed or rendered inoperative in a comparatively short space of time.

Other and further important objects of the invention will be apparent from the disclosures in the accompanying drawing and following specification.

The invention, in a preferred form, is illustrated in the drawing and hereinafter more fully described.

Figure 1:
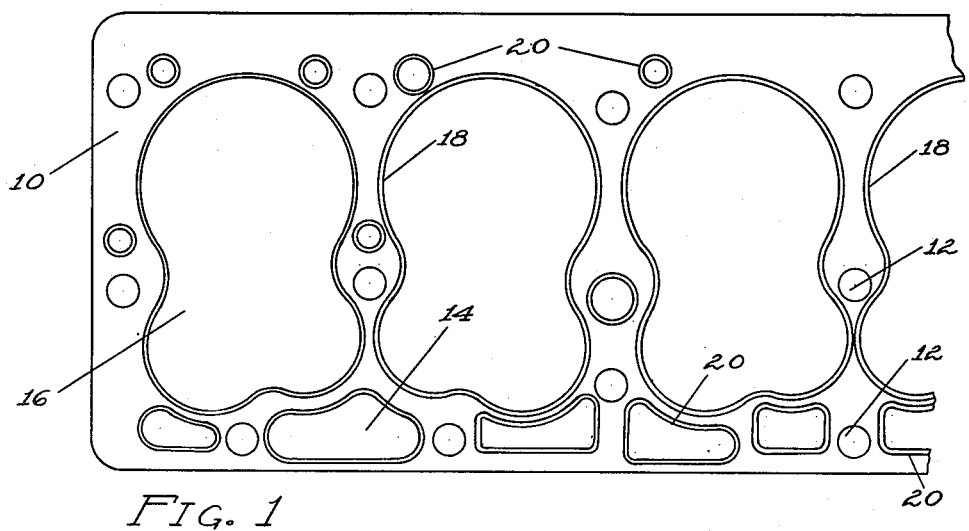
Figure 1 is a top plan view of a representative cylinder head gasket embodying the invention.

The reference numeral 10 indicates generally the top plate of the improved gasket of this invention, the same being of a rather tough and flexible metal such as steel, copper or the like, and for most purposes, this metal should be approximately .010 inch thick.

The gasket has the usual bolt holes 12, water holes 14 and combustion chamber openings 16 therein.

The bottom plate of the gasket, preferably also of the same type of metal, is, in one embodiment of the invention, turned up into integral flanges 18 around the combustion chamber openings, as best shown in Figure 1. Other flanges 20 which may or may not be integral with the bottom plate are turned up around the water openings.

As described in the earlier patents afore-mentioned, an all-metal gasket, even though composed of laminations, is unsatisfactory from many viewpoints in that it does not have the required compressibility necessary to produce a good seal between the cylinder head and block of the modern internal combustion engine regardless of whether this be the usual high compression engine or even an engine of the Diesel type.

Figure 2:
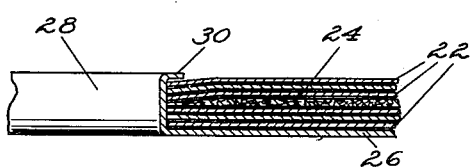
Figure 2 is a partial sectional view illustrating one embodiment of the invention.

Therefore, we have incorporated one or more layers of asbestos or other similar fibrous packing material into the laminated metal gasket. For example, in Figure 2, there is shown a number of laminations of metal 22 which may be four to six or more, and between these laminations, preferably in the middle thereof, is a layer of asbestos 24 which, in most cases, should be made slightly thicker than the metal layers, preferably from .015 to .020 inch. It will be noted that the bottom layer of metal 26, which has an integral turned-up portion 28 to form a flange around the combustion chamber and other openings, may also be slightly thicker than the other metal laminations.

An inwardly turned edge 30 of the flange 28 connects the laminations together into an integral unit, and, furthermore, so compresses the layer of asbestos 24, which can be beveled at its edges, that very little of the same is exposed behind the flange 28, thereby providing a practically all-metal barrier, which will effectively resist and carry away the excess heat prevailing at these parts of the gasket, namely, those portions around and about the combustion chamber openings, while, at the same time, providing a practically flush surface over both the upper and lower faces of the gasket.

Figure 3:
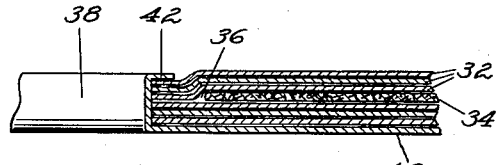
Figure 3 is a sectional view similar to Figure 2, illustrating a slightly different embodiment of the invention.

A slight modification of this idea is presented in Figure 3 wherein the metal laminations 32 have a single layer of asbestos 34 spaced therebetween, the asbestos, however, being cut away at a point 36 so that there will be no necessity for unduly compressing the same when the flange 38 of the lower face 40 of the gasket is bent down as at 42 to provide an integral construction as shown. This also acts to bend down the upper laminations 32 and to present a complete and solid metal barrier around and about the combustion chamber openings while, at the same time, the necessary resiliency of the gasket over substantially all of its surface is retained.

Figure 4:
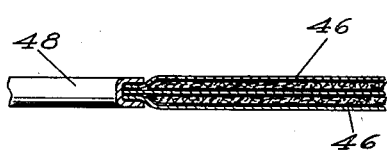
Figure 4 is a further sectional view, showing a further modification.

If slightly more resiliency is desired, the gasket may include one or more extra sheets of asbestos of the like as shown at 44 in Figure 4, these being alternated with metallic laminations 46. A slightly different manner of flanging and connecting the laminations together is illustrated in this figure, the flange 48 being separate from the laminations but clinching the same together by having its two edges bent rearwardly as shown. In this case, the asbestos layers 44 are preferably cut away or set back a slight distance from the cylinder openings so as to allow of a complete compressing of the metal laminations together within the flange without any intermediate layers, thereby again presenting a solid metal front or barrier at the parts subject to the most heat, while, at the same time, allowing of the necessary ductility and resiliency throughout the major portion of the gasket.

Figure 5:
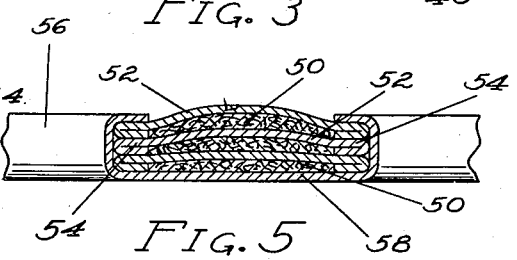
Figure 5 illustrates still another modified form.

A still further embodiment is illustrated in Figure 5 wherein three or more layers of asbestos 50 are provided having laminations of metal 52 therebetween, the asbestos layers being smaller in extent than the metal layers and with the edges of the metal layers bent rearwardly upon each other as illustrated at 54 so as to perform two functions. The first function is to compensate for the thickness of the removed asbestos, and the second function is to provide a solid metallic barrier in and about the combustion chamber openings. A unitary construction is assured by forming integral or other flanges 56 from the lower layer 58 as will be obvious. Here again is provided a gasket which includes the desired compressible qualities while, at the same time, providing a unitary smooth surface throughout its upper and lower faces together with an all-metal barrier about the combustion chamber openings. Another advantage of these all-metal barriers is the quicker carrying away of heat from those parts of the gasket most subject to high temperatures and which would, otherwise, deteriorate more quickly.

It will be, therefore, obvious that herein is provided a combination metal and asbestos gasket which, on account of its laminated structure, is particularly well adapted for modern high compression internal combustion engine service, and which will, on account of its qualities of ductility and compressibility, enable an automatic adjustment to compensate for many irregularities in the surfaces of motor block and head. Furthermore, the expense of such a gasket is appreciably less than that composed entirely of metallic laminations. The use of somewhat thicker layers of asbestos will enable an equalization under compression when the gasket is installed, and the structure is such that this condition will prevail as long as the gasket is in use. The combination of solid layers of metal around the combustion chamber openings effectively prevents burning out, and the backing of the same by intermediate or alternate layers of asbestos or other non-metallic packing material produces in many respects a better heat transferring principle.

The use of a heat resisting non-metallic non-conducting material with adjacent laminations of metal in a gasket, and, at the same time, the incorporation and retaining of all-metal barriers and heat conductors around the combustion chamber openings, is believed to be new in the art. Another feature is countersinking of the flanges, tending to better hold the gasket in position, as, when the head is tightened on the block, the thickness of the packing material over the major portion of the gasket is still further reduced, thereby further avoiding the tendency to overheat. It is believed that there is also less surface friction between asbestos and metal than between layers of metal, thereby making the gasket more adaptable for automatic adjustment to irregularity, and this is particularly true when a gasket of this type is used in either cylinder head or manifold work.

We are aware that many changes may be made and numerous details of construction varied throughout a wide range without departing from the principles of this invention, and we, therefore, do not purpose limiting the patent granted hereon otherwise than as necessitated by the prior art.

We claim as our invention:

1. A laminated gasket, including a plurality of metallic layers and at least one layer of resilient packing material, and means for joining the laminations together, said means comprising flanges around the openings of the gasket, the edges of the flanges being countersunk flush with the gasket surfaces, that portion of the resilient packing material beneath said flange edges being cut back to allow the aforesaid countersinking, the edges of the metallic laminations being bent rearwardly upon each other to fill the spaces provided by the eliminated resilient material.

2. A laminated gasket, having openings therethrough, said gasket comprising a bottom metallic layer, flanges for the openings formed integral with said layer, a plurality of alternating laminations of metal and resilient packing material within and held by the flanges, the resilient packing material being cut back from the openings past the line of the outer edge of the flange, and integral bent-over portions of the metallic laminations replacing said cut-back portions of the resilient laminations whereby a solid metallic barrier is formed around said openings.

JOHN H. VICTOR.
JOSEPH B. VICTOR.